US011304516B2

(12) United States Patent
McCardle et al.

(10) Patent No.: US 11,304,516 B2
(45) Date of Patent: Apr. 19, 2022

(54) EQUIPMENT MOUNTING SYSTEM

(71) Applicant: Stillwater Consulting, LLC, Boulder, CO (US)

(72) Inventors: Christopher Lance McCardle, Boulder, CO (US); Gregg Allen Wicken, Boulder, CO (US)

( * ) Notice: Subject to any disclaimer, the term of this patent is extended or adjusted under 35 U.S.C. 154(b) by 0 days.

(21) Appl. No.: 17/334,391

(22) Filed: May 28, 2021

(65) Prior Publication Data
US 2021/0368979 A1    Dec. 2, 2021

Related U.S. Application Data
(60) Provisional application No. 63/031,675, filed on May 29, 2020.

(51) Int. Cl.
*A47B 81/00*    (2006.01)
*B60R 9/08*    (2006.01)
*A47B 45/00*    (2006.01)

(52) U.S. Cl.
CPC .............. *A47B 81/00* (2013.01); *A47B 45/00* (2013.01); *B60R 9/08* (2013.01)

(58) Field of Classification Search
CPC ........... A47B 81/00; A47B 45/00; B60R 9/08; B60R 9/10; B60R 9/12; B60R 9/06
See application file for complete search history.

(56) References Cited

U.S. PATENT DOCUMENTS

| 3,294,247 A | | 12/1966 | Norrington | |
|---|---|---|---|---|
| 3,301,421 A | * | 1/1967 | Lutters | B60R 9/08 414/462 |
| 3,458,073 A | * | 7/1969 | Dawson | B60R 9/06 414/462 |
| 3,586,188 A | * | 6/1971 | Cambell | B60R 9/10 414/462 |
| 3,837,514 A | * | 9/1974 | Barnes | B60R 9/08 414/462 |
| 3,891,262 A | | 6/1975 | Brunel | |
| 3,912,139 A | * | 10/1975 | Bowman | B60R 9/10 410/3 |
| 4,061,257 A | * | 12/1977 | St. Clair | B60R 9/06 224/508 |
| 4,081,118 A | * | 3/1978 | Mason | B60P 3/1008 224/324 |

(Continued)

FOREIGN PATENT DOCUMENTS

| FR | 2432954 A1 * | 3/1980 | ............... B60R 9/10 |
|---|---|---|---|
| FR | 2483866 A1 * | 12/1981 | ............... B60R 9/06 |

*Primary Examiner* — Stanton L Krycinski
(74) *Attorney, Agent, or Firm* — Will Hunziker (57) ABSTRACT

A mounting system utilizing multidirectional pivoting, retracting, extending, and vertical lift to allow it to fit longer items diagonally into truck beds, cargo vehicles, mobile trailers, or other vehicles; and making moving or removing the equipment stored therein much easier. The mounting system is also designed to be installed inside the bed of a truck and still allow for a "bed cover" or tonneau cover to be used over the mounting system so that the mounting system and equipment mounted therein remain safely inside the vehicle. The mounting system and attached equipment can easily be removed while not in use and re-attached to secondary mounting location for safe storage.

16 Claims, 9 Drawing Sheets

(56) References Cited

U.S. PATENT DOCUMENTS

| | | | | |
|---|---|---|---|---|
| 4,236,854 A * | 12/1980 | Rogers | | B60P 7/15 |
| | | | | 410/121 |
| 4,271,997 A | 6/1981 | Michael | | |
| 4,330,065 A | 5/1982 | Haddad | | |
| 4,444,427 A | 4/1984 | Martin | | |
| 4,469,257 A | 9/1984 | Parker | | |
| 4,483,504 A | 11/1984 | Duwelshoft | | |
| 4,717,055 A | 1/1988 | San Juan | | |
| 4,720,031 A | 1/1988 | Zimmerman | | |
| 4,863,082 A | 9/1989 | Evans et al. | | |
| 4,971,234 A | 11/1990 | Hay | | |
| 5,005,846 A * | 4/1991 | Taylor | | B62B 3/10 |
| | | | | 280/30 |
| 5,092,504 A * | 3/1992 | Hannes | | B60R 9/00 |
| | | | | 211/17 |
| 5,127,564 A * | 7/1992 | Romero | | B60R 9/00 |
| | | | | 224/403 |
| 5,599,053 A | 2/1997 | Wilson | | |
| 5,906,304 A | 5/1999 | Baldacchino | | |
| 5,957,353 A | 9/1999 | Clement | | |
| 5,988,722 A * | 11/1999 | Parri | | B60P 1/003 |
| | | | | 224/403 |
| 6,003,923 A | 12/1999 | Scott et al. | | |
| 6,007,129 A | 12/1999 | Kearney, Jr. | | |
| 6,019,265 A * | 2/2000 | Deloza | | B60R 9/00 |
| | | | | 224/405 |
| 6,328,364 B1 | 12/2001 | Darbishire | | |
| 6,464,274 B2 | 10/2002 | Mink et al. | | |
| 6,481,604 B1 | 11/2002 | Beene et al. | | |
| 6,505,764 B2 * | 1/2003 | Vining | | B60R 9/00 |
| | | | | 224/403 |
| 6,641,014 B2 | 11/2003 | McNalley | | |
| 6,679,408 B1 | 1/2004 | Erickson et al. | | |
| 6,732,984 B2 * | 5/2004 | Tsai | | A47F 5/0006 |
| | | | | 211/17 |
| 6,827,543 B2 * | 12/2004 | O'Neil | | B60P 3/07 |
| | | | | 414/537 |
| 6,834,786 B2 * | 12/2004 | Hansen | | B60P 3/122 |
| | | | | 211/20 |
| 7,083,219 B1 | 8/2006 | Gregory | | |
| 7,175,060 B1 | 2/2007 | Carpenter et al. | | |
| 7,246,731 B1 * | 7/2007 | Matherne, Sr. | | B60P 3/073 |
| | | | | 224/403 |
| 7,527,324 B1 | 5/2009 | Clonan | | |
| 7,621,493 B2 * | 11/2009 | Vermette | | B60R 9/10 |
| | | | | 224/500 |
| 7,841,821 B2 * | 11/2010 | Miro | | B60R 9/08 |
| | | | | 414/462 |
| 7,857,177 B2 * | 12/2010 | Reeves | | B60P 3/077 |
| | | | | 224/403 |
| 8,245,893 B2 * | 8/2012 | Sautter | | B60R 9/042 |
| | | | | 224/310 |
| 8,286,843 B2 * | 10/2012 | Bogoslofski | | B60R 9/06 |
| | | | | 224/509 |
| 8,985,415 B2 * | 3/2015 | Heininger | | B60P 3/07 |
| | | | | 224/403 |
| 9,221,402 B2 * | 12/2015 | Ressler | | B62H 3/00 |
| 9,254,792 B2 * | 2/2016 | Patton | | B60P 3/122 |
| 9,327,633 B1 * | 5/2016 | Patton | | B60P 3/077 |
| 9,352,698 B2 | 5/2016 | Romanelli | | |
| 9,409,508 B2 * | 8/2016 | Graham | | B62H 3/04 |
| 9,656,589 B2 | 5/2017 | Crawford, Jr. | | |
| 9,745,002 B2 * | 8/2017 | Eddings, Jr. | | B62D 33/0207 |
| 9,834,151 B2 | 12/2017 | Henry | | |
| 10,384,621 B2 * | 8/2019 | Mehlen | | B60R 9/10 |
| 10,479,284 B1 * | 11/2019 | Salyer | | B60R 9/06 |
| 2002/0180231 A1 | 12/2002 | Fox | | |
| 2004/0134953 A1 | 7/2004 | Perez | | |
| 2006/0186157 A1 | 8/2006 | Dibble | | |
| 2011/0024469 A1 * | 2/2011 | Key | | B60R 9/08 |
| | | | | 224/274 |
| 2013/0264367 A1 * | 10/2013 | Hill | | B60R 9/06 |
| | | | | 224/413 |
| 2015/0102077 A1 | 4/2015 | Martin | | |
| 2015/0336513 A1 * | 11/2015 | Frost | | B60R 9/042 |
| | | | | 296/3 |

* cited by examiner

EQUIPMENT MOUNTING SYSTEM

CROSS REFERENCE TO RELATED APPLICATIONS

This application claims the benefit of U.S. Provisional Patent Application No. 63/031,675, filed on May 29, 2020, also titled "Equipment Mounting System" which is incorporated by reference herein in its entirety for all purposes.

BACKGROUND OF THE INVENTION

1. Field of the Invention

The present invention relates to retaining systems, and more particularly to equipment stowing and retaining systems for attaching and retaining sporting equipment on a vehicle.

2. Description of Related Art

"Racks" and other mounting systems for mounting items to vehicles are well known in the art. These systems typically attach to rails, hard mounts, or other attachment points on a vehicle. Often these attachment points are positioned on the roof, or on the top of the perimeter of the bed of a truck. Often these mounting systems are fixed in place, and do not allow for easy readjustment of the system when the system is used to mount different or oversized items.

Often skis and snowboards are mounted to mounting systems for transportation.

However, skis and snowboards can be cumbersome to load or unload from the mounting systems; in addition, it may be desirable to mount skis so that they are not easily seen, for example within the bed of a truck or the cargo area of a van. This can be difficult because many skis are too long to fit within the bed of a truck or the cargo area of a van with traditional fixed mounting systems that hold them parallel to the length of the storage area. If the skis and snowboards fit in the bed of the truck or storage area of the van, then they can be hard to access from the end of the vehicle or over the side.

A very common method of equipment mounting is to use a rack that is installed on top of the pickup truck bed. These racks are designed to mount equipment above the topmost surface of the trucks beds perimeter edges. These conventional types of racks pose an inherent problem as most of them are not compatible with tonneau-type bed covers that either fold as panels or roll up towards the cab of the pickup truck. These racks are also restricted to an installed position at a straight alignment relative to the vehicle so that equipment mounts in one direction—front to back, so longer equipment overhangs outside the footprint area of the truck bed. This traditional mounting method can be unsafe or pose hazards because it is limited to holding long equipment outside the truck bed and extending beyond the vehicle's length. Other common rack solutions that pose inherent problems are those which are installed onto the roof of vehicles where they are difficult to reach and access equipment thereon. Such systems also leave the equipment exposed and unprotected from the elements.

These aforementioned systems fail to meet the needs of the industry because it is difficult for the user to reach mounted equipment, and it is dangerous if the user attempts to climb up onto the vehicle or the vehicle's tires to access equipment mounted on a rooftop-style rack or attempts to climb into the back of a pickup truck to access equipment.

SUMMARY

The scope of the present invention is defined solely by the appended claims and detailed description of a preferred embodiment and is not affected to any degree by the statements within this summary. The mounting system disclosed herein overcomes known problems in the art related to a lack of mounting locations on vehicles for equipment transportation and storage. A mounting system utilizing multidirectional pivoting, retracting, extending, and vertical lift to allow it to fit longer items diagonally into truck beds, cargo vehicles, mobile trailers, or other vehicles; and making moving or removing the equipment stored therein much easier. The mounting system is also designed to be installed inside the bed of a truck and still allow for a "bed cover" or tonneau cover to be used over the mounting system so that the mounting system and equipment mounted therein remain safely inside the vehicle. The mounting system and attached equipment can easily be removed while not in use and re-attached to secondary mounting location for safe storage. Additional features of the invention are described in the detailed description, drawings, and claims below.

BRIEF DESCRIPTION OF THE DRAWINGS

Various embodiments are described herein with reference to the following Drawings Not all alternatives and options are shown in the Drawings and, therefore, the Claims are not limited in scope to the content of the Drawings. Elements in the several figures are illustrated for simplicity and clarity and have not necessarily been drawn to scale. Also, common, but well-understood elements that are useful or necessary in commercially feasible embodiment are often not depicted in order to facilitate a less obstructed view of these various embodiments of the present disclosure.

1. FIGURES

Corresponding reference characters indicate corresponding components throughout the several figures of the Drawings.

2. REFERENCES

4 Mounting System
8 Vehicle Rails
12 Headrail
16 Base
20 Beams
24 Equipment Brackets
28 Forward Connection Assembly
32 Aft Connection Assembly
36 Extension Rails
40 Center Rail
44 Vehicle Mounting Brackets
52 Upper Connection Plate
53 Upper Guide Portion
56 Lower Connection Plate
57 Lower Guide Portion
60 Connection Plate Fasteners
64 Central Beam Structure
65 Vertical Tube Housing
66 Horizontal Tube Housing
68 Vertical Tube
72 Horizontal Tube
76 Elongated Slot
80 Base Bracket
84 Fasteners
86 Handle Assembly
88 Handle Sleeve
92 Handle Post
96 Skis
100 Vehicle
104 Vehicle Bed
108 Tail Gate

DETAILED DESCRIPTION

The following description is not to be taken in a limiting sense but is made merely for the purpose of describing the general principles of exemplary embodiments, no limitation of the scope of the invention is thereby intended. The phrases: "in one embodiment," "in an embodiment," and similar language such as throughout this specification may, but do not necessarily, all refer to the same embodiment. The phrases "at least one," "one or more," and "and/or" are open-ended expressions that are both conjunctive and disjunctive in operation. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The described features, structures, methods, steps, or characteristics of the present disclosure may be combined in any suitable manner in one or more embodiments. In other instances, well-known structures, materials, or operations are not shown or described in detail to avoid obscuring aspects of the present disclosure. Further, all numbers expressing dimensions, physical characteristics, and so forth, used in the specification and claims are to be understood as being modified in all instances by the term "about".

Regarding the illustrations, as used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

For the purposes of promoting an understanding of the principles of the present invention, reference will now be made to the embodiments illustrated in the drawings and specific language will be used to describe the same.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
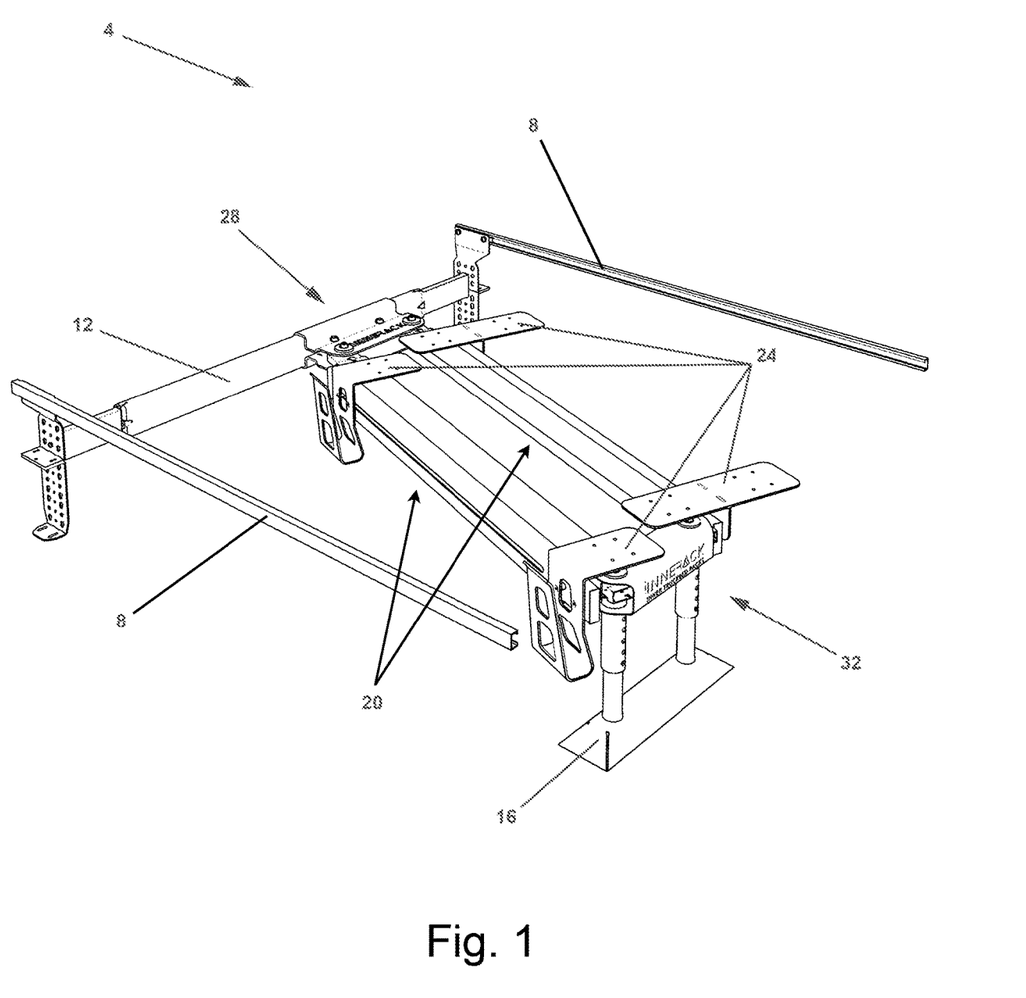
FIG. 1 is a perspective view of an equipment mounting system, in accordance with an embodiment of the present disclosure.
Figure 2:
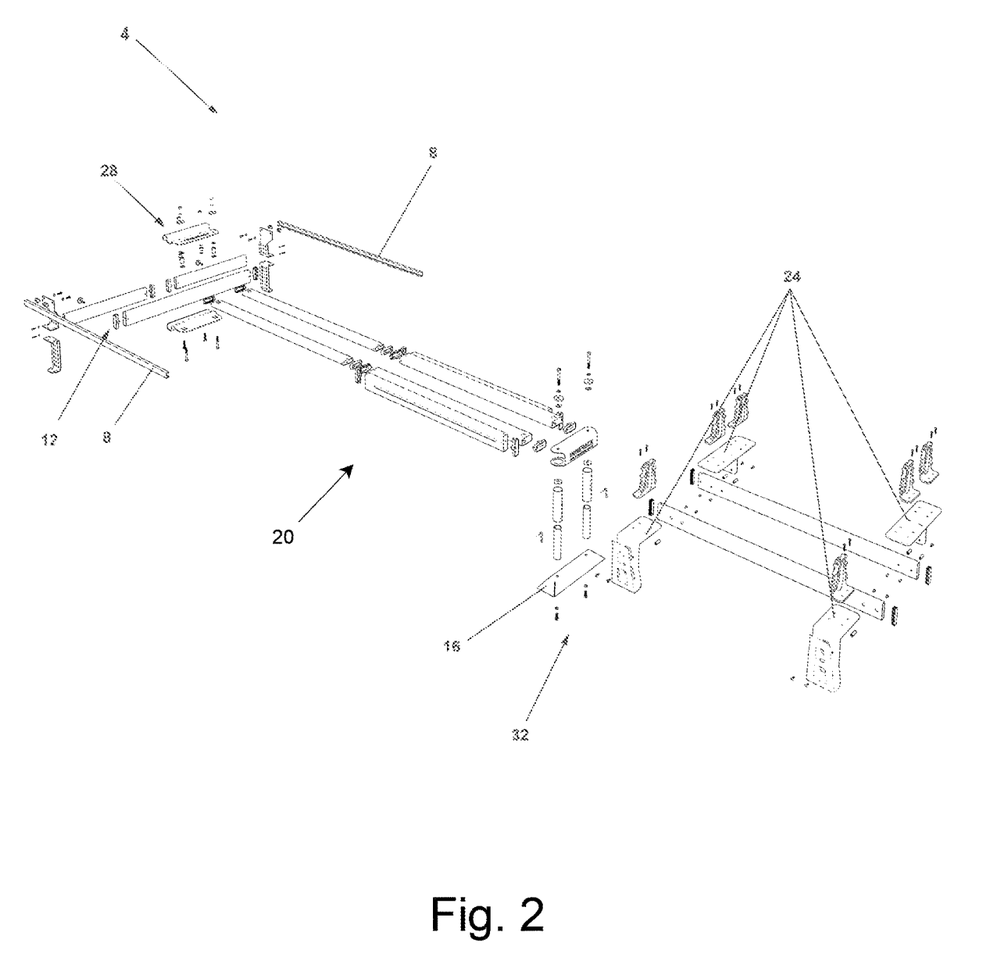
FIG. 2 is a perspective assembly view of the embodiment of the equipment mounting system of FIG. 1.

FIG. 1 illustrates one embodiment of a mounting system 4 for mounting equipment in a vehicle. FIG. 2 illustrates an assembly view of the embodiment of the mounting system illustrated in FIG. 1. The mounting system 4 attaches to vehicle rails 8 that are attached to or are a part of a vehicle (e.g., the bed of a truck). Preferably there are two vehicle rails 8 on opposite sides, but the mounting system 4 can be used with one rail 8 in some embodiments. The mounting system 4 includes a headrail 12, a base 16, and one or more beams 20 that extend between the headrail and the base 16. The headrail 12 attaches to the rails 8, and the beams 20 are attached to the headrail 12 by a forward connection assembly that is slidably coupled to the headrail 12.

In some embodiments, the vehicle rails 8 are part of the truck bed sides (or in another cargo areas of a vehicle). For example, the rails 8 can be factory-installed "T-track" mounting rails that are commonly found in truck beds. In other embodiments, the rails 8 can be attached to the truck bed sides as part of the mounting system 4, or as separate elements that are attached to the truck bed sides. The T-track mounting rails have a "T"-shaped slot that receives a post (e.g., a fastener such as a bolt) that is used with a complementary nut to attach the headrail 12 to the truck. It will be appreciated that the fastener-nut arrangement can be reversed such that the nut is placed in the T-shaped slot. In one example, the fastener or nut that is inserted into the T-shaped slot can have 'roller' functionality. That is, the roller fastener (such as a roller nut) reduces friction when moved along the T-slot so that the mounting system 4 can more easily be mounted to the front of the truck bed. The reduced friction minimizes binding that may be caused by simultaneous movement of the headrail 12 (and vehicle mounting brackets 44, which attach the headrail 12 to the rails 8) along both of the rails 8. A lock mechanism (e.g., a knob with a threaded post) can secure the assembly in position.

In yet other embodiments, the headrail 12 is not connected to vehicle rails 6 at all, and is instead held between two opposing walls of the vehicle, such as walls of a truck bed, via a turnbuckle or pressure fit. Various fasteners may be used to connect components herein. For example, bolts and screws may be selected from button head socket style that incorporate a pin in the center of the recessed hex socket so a common "Allen" wrench, star or "Torx" bit without a hole in the end cannot be inserted. Spanner type bolt heads or tri-groove nuts may also be selected. Such exemplary fasteners provide additional security in that the tools to remove such fasteners are less commonly available than traditional fasteners.

Referring back to the headrail 12 as shown in FIG. 1, the telescoping beams 20 are extendable between an extended position and a retracted position. Two telescoping beams 20 are shown in the Figures for ease of illustration, although additional or fewer beams are contemplated. The telescoping beams 20 include equipment brackets 24 on which various equipment or equipment connection assemblies can be mounted. The equipment brackets 24 are designed to accommodate and securely hold equipment including, but not limited to, various sizes and types of: ski poles, snowboards, wakeboards, surfboards, paddleboards, paddles, kayaks and other personal watercraft or boats, bicycles, fishing rods, tackle boxes, rifles and their cases, ammunition, ice chest type coolers, beverage dispensing jugs or vessels, barbecue grills and smokers, landscaping tools like shovels, rakes, garden hoes, powered weed trimmers, chainsaws, axes, power equipment for job-site contractors, tool chests, various types of components organizers, and folding work tables or benchtops.

The telescoping beams 20, further include a forward end and an aft end. The forward end of each telescoping beam 20 is attached to a forward connection assembly 28. As shown, the connection between the forward end and the forward connection assembly 28 may be a pin connection provided in each of the two telescoping beams 20. A pin connection allows for rotational or pivotal movement of the telescoping beams 20 about their respective pin connections in the forward connection assembly 28. In other embodiments of the forward connection assembly, a flexible shaft coupling or other hinge providing rotational or pivotable movement between the forward end and the forward connection assembly 28 can be used instead of a pin connection.

Figure 5:
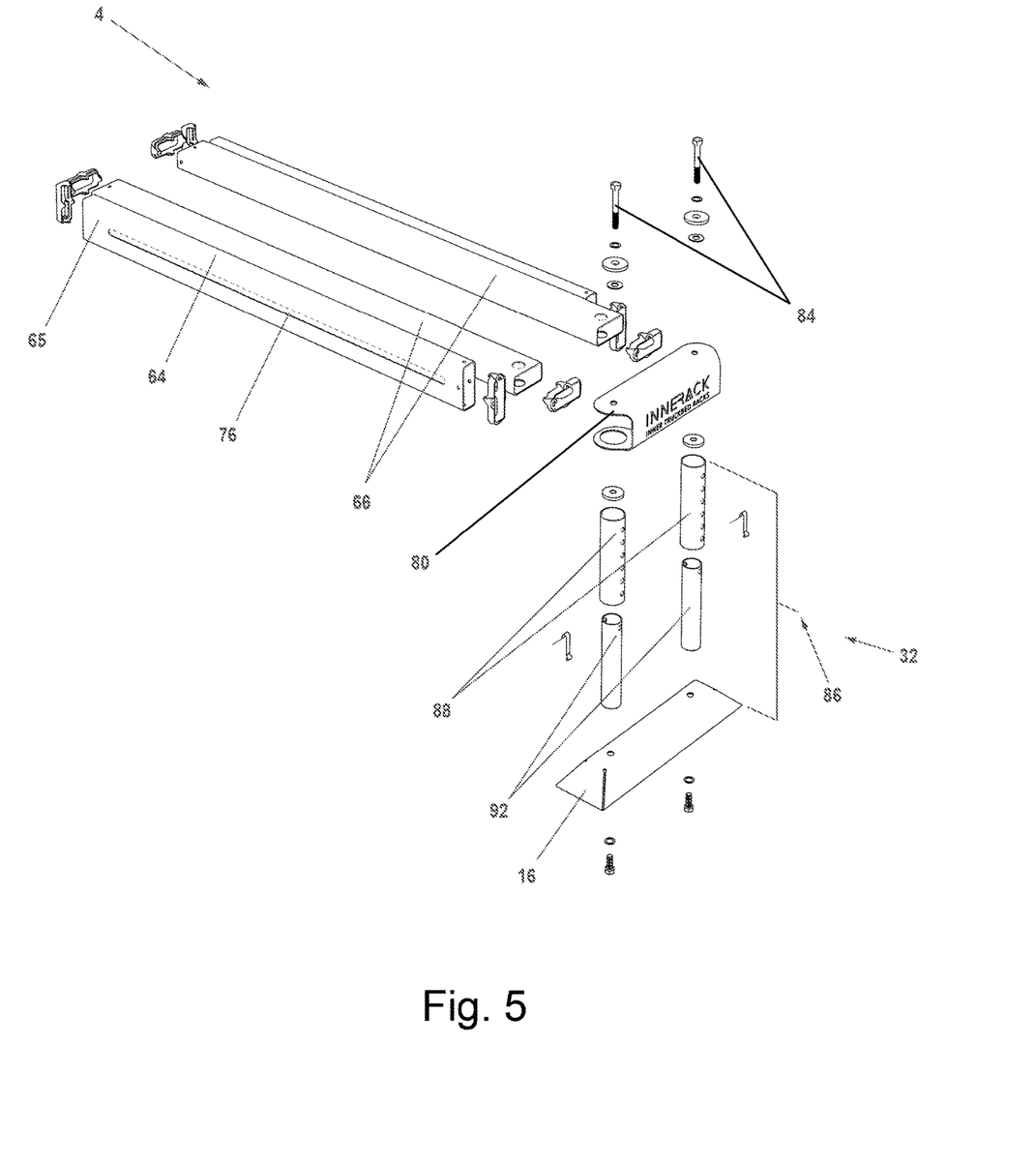
FIG. 5 is a detailed perspective view of an aft portion of the embodiment of the equipment mounting system of FIG. 1.

The aft end of each of the telescoping beams 20 is connected to the base 16 via an aft connection assembly 32. With reference to FIG. 5, the connection between the telescoping beams 20 and the aft connection assembly 32 is a pin connection, which allows for rotational or pivotal movement of the telescoping beams 20 about their respective pin connections in the forward and aft connection assemblies 32, 28 while staying parallel. The beams are capable of being locked at different extensions and angles so that the mounting system and equipment do not swing around in the back of the vehicle damaging the vehicle or the equipment. Various means for locking mechanisms are well known in the art. Such as, pressure fit locks, twist locks, peg and hole locks, button locks, keepers, snap locks, tie locks, clips, screws, bolts, etc. Likewise, the vehicle rails 10, headrail 12, base 16, equipment brackets 24, forward connection assembly 28, aft connection assembly 32, vehicle mounting brackets 44, and base bracket can also have means for locking, such as, pressure fit locks, twist locks, peg and hole locks, button locks, keepers, snap locks, tie locks, clips, screws, bolts, etc.

Figure 3:
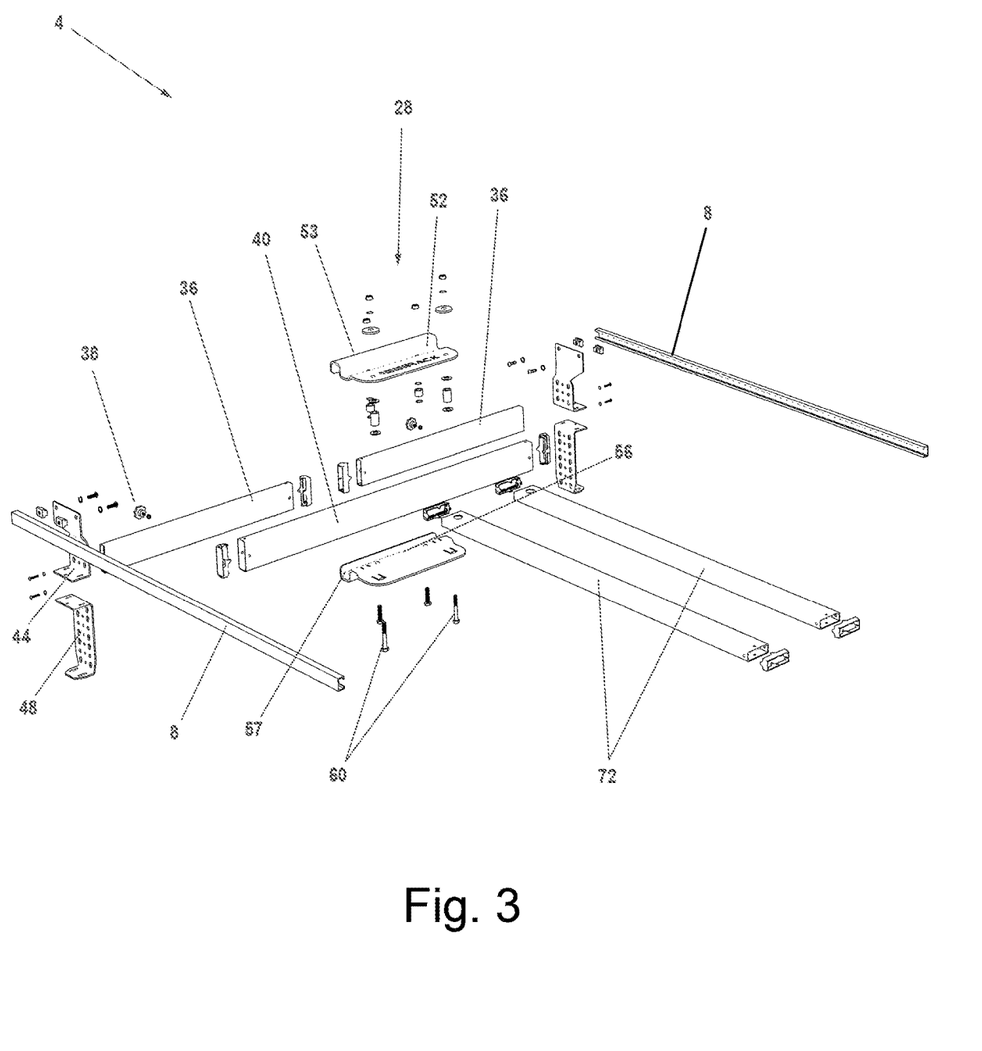
FIG. 3 is a detailed perspective view of a forward portion of the embodiment of the equipment mounting system of FIG. 1.

FIG. 3 illustrates an exploded view of one embodiment of the forward portion of the mounting system 4 of FIG. 1. The headrail 12 may comprise two extension rails 36 that are connected to (e.g., slidable within) a center rail 40. The extension rails 36 telescope relative to the center rail 40 to fit within the storage area and rigidly attach the headrail 12 to the truck bed. As shown in the Figures, the extension rails 36 extend out from the center rail 40 and connect to the rails 8 via the mounting brackets 44. The center rail 40 includes a cavity that each of the extension rails 36 are insertable into and extendable from. Such a configuration allows for adjustability of the headrail 12 such that a length of the headrail 12 can be adjusted to fit between vehicle rails 8 of a given vehicle. At a maximum extension length of the headrail 12, the center rail 40 only surrounds an end portion each of the extension rails 36. At a minimum extension length of the headrail 12, each of the extension rails 36 extend into the center rail 40 until the extension rails 36 interfere with one another within the cavity of the lateral connection 40. An interference retainer 38 (i.e., a screw knob including a threaded male stud or a threaded security bolt) include a retainer portion, such as a bolt, that passes through the center rail 40 to press against the extension rail 36. The bolt of the interference retainer 38 may engage the extension rail 36 and the center rail 40 to fix these rails relative to one another.

In some configurations of the mounting system 4, it may be advantageous to position the headrail 12 at different heights within the truck bed or other storage area. This can be accomplished by an extension bracket 48, which attaches to the bracket 44 to increase the mounting flexibility of the system 4. For example, the headrail 12 can be lowered (i.e., positioned closer to the truck bed floor) to accommodate larger or taller equipment while keeping the equipment below the top of the truck bed. Similarly, the headrail 12 can be raised to provide room under the equipment (e.g., for additional equipment).

Each of the vehicle mounting brackets 44 and the extension brackets 48 may comprise numerous connection points for an extension rail 36 to be connected. Other mechanisms may be used to adjust the vertical position of the headrail 12. For example, adjustable posts (e.g., a post with an adjustable threaded insert, a post with an adjustable pinned insert, etc.) can be used to attach the headrail 12 to the rails 8 in a way that provides flexibility for the vertical position of the headrail 12.

With continued reference to FIG. 3, the forward connection assembly 28 includes an upper connection plate 52 and a lower connection plate 56 that are attached to opposite sides of the headrail 12 by connection plate fasteners 60. More specifically, the upper connection plate 52 includes an upper guide portion 53 that is coupled to an upper side of the center rail 40, and the lower connection plate 56 includes a lower guide portion 57 that is coupled to a lower side the center rail 40. By virtue of this attachment, the upper and lower connection plates 52, 56 are positioned to slide or glide along the headrail 12. The connection plate fastener 60 extends through the lower connection plate 56, through a hole provided in the corresponding telescoping beam 20, through the upper connection plate 52, and is secured by a nut. The connection plate fasteners 60 provide a pin connection between the forward connection assembly 28 and the telescoping beams 20, which allows the telescoping beams 20 to pivot relative to the headrail 12.

Figure 4:
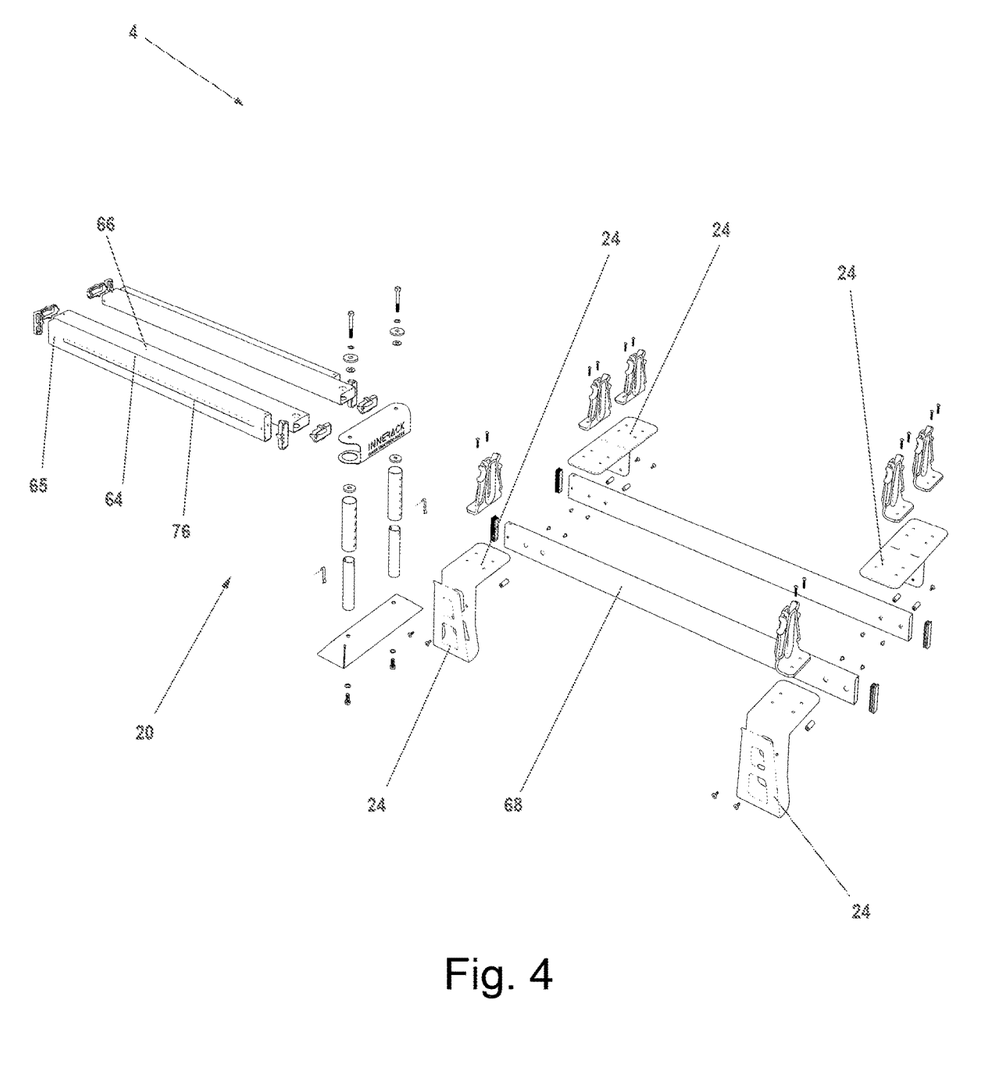
FIG. 4 is a detailed perspective view of a middle portion of the embodiment of the equipment mounting system of FIG. 1.

FIG. 4 illustrates a central part of the mounting system 4, including details about the telescoping beams 20 and how equipment can be mounted to the system 4. As used herein, the term telescoping is not intended to limit the telescoping beams 20 to generally cylindrical configurations; instead, the beams may be of various shapes. For example, I-beams or beams with a "c" cross section, which comprise hollowed out portions therein may be used. Each telescoping beam 20 may comprise a central beam structure 64, a vertical tube 68, and a horizontal tube 72 (shown in FIG. 3). The central beam structure 64 may comprise a vertical tube housing 65 (rear section) that slidably receives the vertical tube 68, and a horizontal tube housing 66 that slidably receives the horizontal tube 72 (forward section). The vertical tube housing 65 and the horizontal tube housing 66 can be attached to each other to form the central beam structure 64 (e.g., by one or more welds, fasteners, etc.). The vertical tube 68 and the horizontal tube 72 can be separately extendable into or out of the central beam structure 64. That is, the vertical tube 68 is extendable in the aft direction (toward the base 16) relative to the vertical tube housing 65 without regard to movement of the horizontal tube 72. Similarly, the horizontal tube 72 is also extendable relative to the horizontal tube housing 66 in the forward direction (toward the headrail 12) without regard to movement of the vertical tube 68. The extensibility of the beams 20 in the fore and aft directions combined with their rotational or pivotal movement about their respective pin connections in the forward and aft connection assemblies 28, 32; enable the user to position the aft assembly 32 and base 16 as desired by virtue of a connection between the vertical tube 68 and the aft assembly 32.

It is contemplated that other embodiments of the mounting system 4, the vertical tube housing 65 is includes a railing to slidably receive the vertical tube 68, and the horizontal tube housing 66 includes a railing to slidably receive the horizontal tube 72, and thus neither the vertical tube housing 65 nor the horizontal tube housing 66 fully surrounds the vertical tube 68 or the horizontal tube 72, respectively, even when fully inserted. Referring back to FIG. 4, each of the vertical tube 68 and the horizontal tube 72 may be fixed in a desired position (e.g., an extension position) using a retainer that limits or inhibits movement of the tube relative to the central beam structure 64. Such a retainer is preferably positioned adjacent or at the base 16 (e.g., relatively close to a tailgate) so that the retainer can be manipulated and easily be accessed by a user.

One or more equipment brackets 24 (four are shown in FIG. 4) may be attached to the vertical tube 68 or central beam structure 64 to support equipment on the system 4. The equipment brackets 24 can be designed based on the type of equipment that is desired to be supported on the mounting system 4. As shown, the equipment brackets 24 located closest to the headrail 12 (the 'fore' equipment brackets) are attached to the vertical tube 68 by fasteners that extend through an elongated slot 76 in the central beam structure 64 and into the fastener holes in the vertical tube 68. The equipment brackets 24 located closest to the base 16 (the 'aft' equipment brackets) are attached to an exposed portion of the vertical tube 68 (i.e. the portion that is outside the central beam structure 64). By virtue of this attachment, the vertical tube 68 and the equipment brackets 24 move together when the vertical tube 68 moves relative to the central beam structure 64. Fore and aft movement of the vertical tube 68 is limited by the attachment of the fore equipment bracket 24 because the fastener(s) engage ends of the elongated slot 76. In other words, the length of the slot 76 determines how far the vertical tube 68 can translate relative to the beam structure 64.

With reference to FIG. 5, the aft connection or base assembly 32 may comprise a base 16, a base bracket 80, and a handle assembly 86 that is positioned between the base 16 and the base bracket 80. The handle assembly 86 has a handle sleeve 88 and a handle post 92 that is disposed in the handle sleeve 88. The horizontal tubes 72 are coupled to the base bracket 80 by fasteners 84 that extend through the base bracket 80 and the base 16 into the handle sleeve 88. This connection is defined by a pinned arrangement such that each of the horizontal rails 72 is rotatable or pivotable relative to the base bracket 80.

The handle post 92 is adjustable relative to the handle sleeve 88 and connects to the base 16 by fasteners. The adjustability of the handle post 92 allows the height of the base bracket 80 (and the height of the overall base assembly 32) to be increased or decreased (e.g., to match the height of the headrail 12). The adjustment may be provided by a pinned connection between the handle sleeve 88 and the handle post 92 (e.g., by a depressible pin or a removable pin), or another adjustable feature (e.g., a screw-like feature that permits the handle post 92 to extend or retract relative to the handle sleeve 88. The handle sleeve 88 can be grasped by a user to move the base assembly 32 to load, stow, or unload equipment in the storage area.

The configuration of the mounting system 4 as shown in FIG. 1 provides storage for equipment (e.g., skis, etc.) that is attached to the equipment brackets 24. A user can manipulate the mounting system 4 to position the equipment brackets 24 within the truck bed by repositioning the base 16. Movement of the equipment brackets forward and aft is provided by the telescoping beams 20. Movement to positions between the vehicle rails 8 is provided by the forward connection assembly 28 (i.e., the forward connection assembly is positionable along the headrail 12 to position the forward ends of the telescoping beams 20) and by the aft connection assembly 32 (i.e., the aft connection assembly 32 is positionable between the vehicle rails 8 as a result of the pin connections provided in the forward connection assembly 28 and in the aft connection assembly 32). Together, the base 16 and the vehicle rails 8 are the only points at which the mounting system 4 contacts or attaches to the vehicle in this embodiment. The base 16 and the headrail 12 can therefore support the weight of the frame assembly and any mounted equipment. The base 16 is shaped and designed to move across the surface (e.g., truck bed, cargo floor, deck, etc.) to put the mounting system 4 in a compact configuration within the storage space.

In some embodiments, the locations of the central beam structure 64 and the horizontal tube 72 relative to the headrail 12 and the base assembly 32 may be flipped. More specifically, the horizontal tubes 72 can be connected directly to the aft connection assembly 32 via a pinned connection, and the central beam structure 64 can be directly attached to the base assembly 32. In this arrangement, the beam structure 64 moves with the base assembly 32. Thus, for the same-length longitudinal elongated slots 76, equipment can be positioned several inches closer to the tailgate or access opening while still providing an equivalent ability to store the equipment.

Figure 6A:
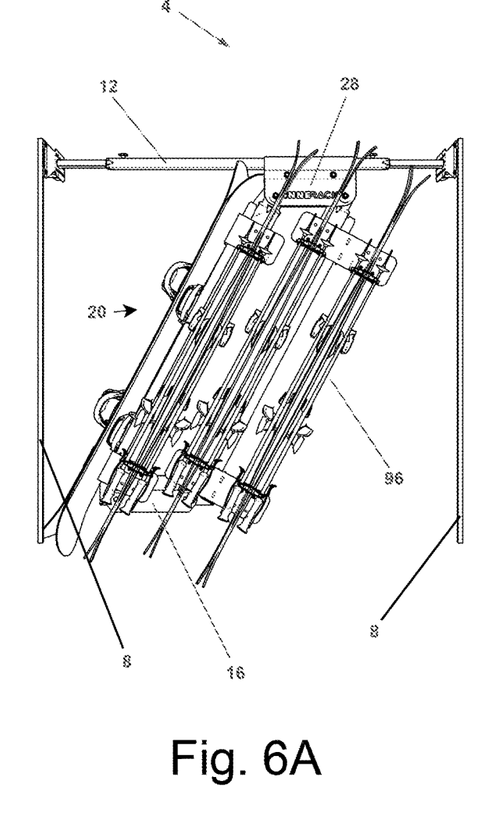
FIGS. 6A and 6B are top-down views of the embodiment of the equipment mounting system of FIG. 1 shown in a stowed position and an extended position, respectively.
Figure 6B:
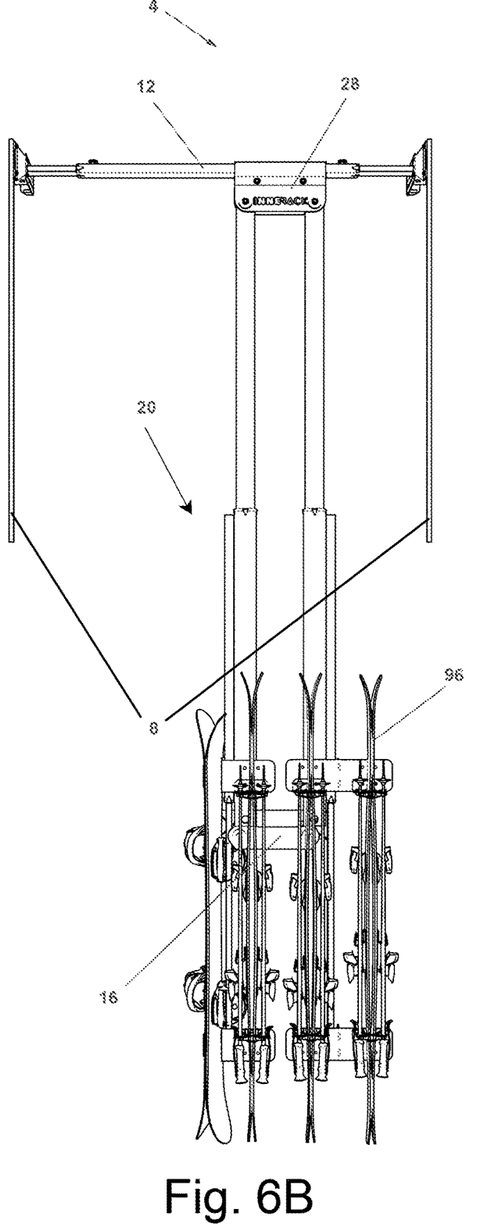
Figure 7A:
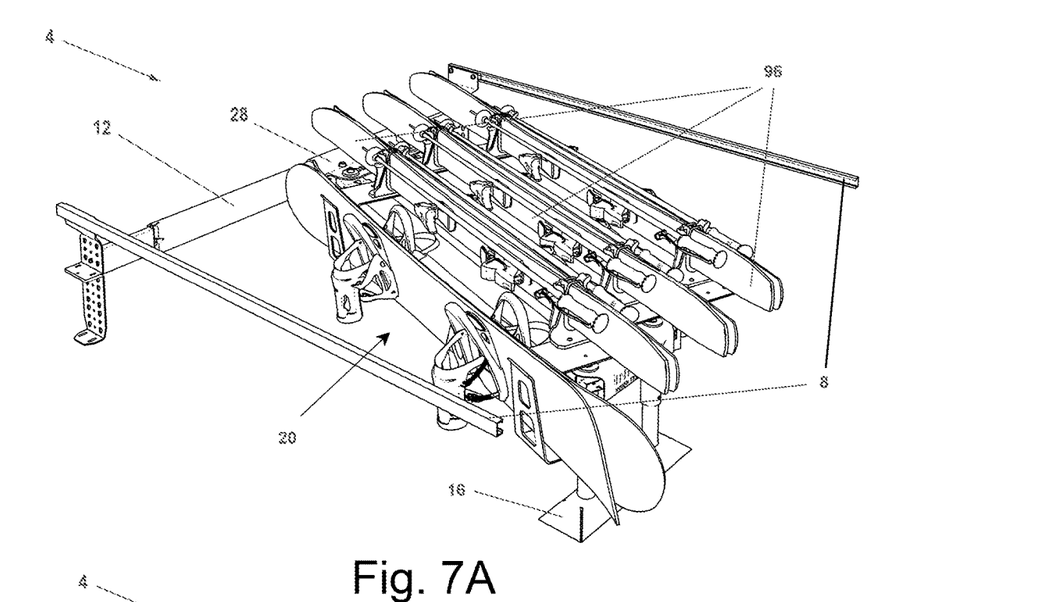
FIGS. 7A and 7B are perspective views of the embodiment of the equipment mounting system of FIG. 1 shown in a stowed position and an extended position, respectively.
Figure 7B:
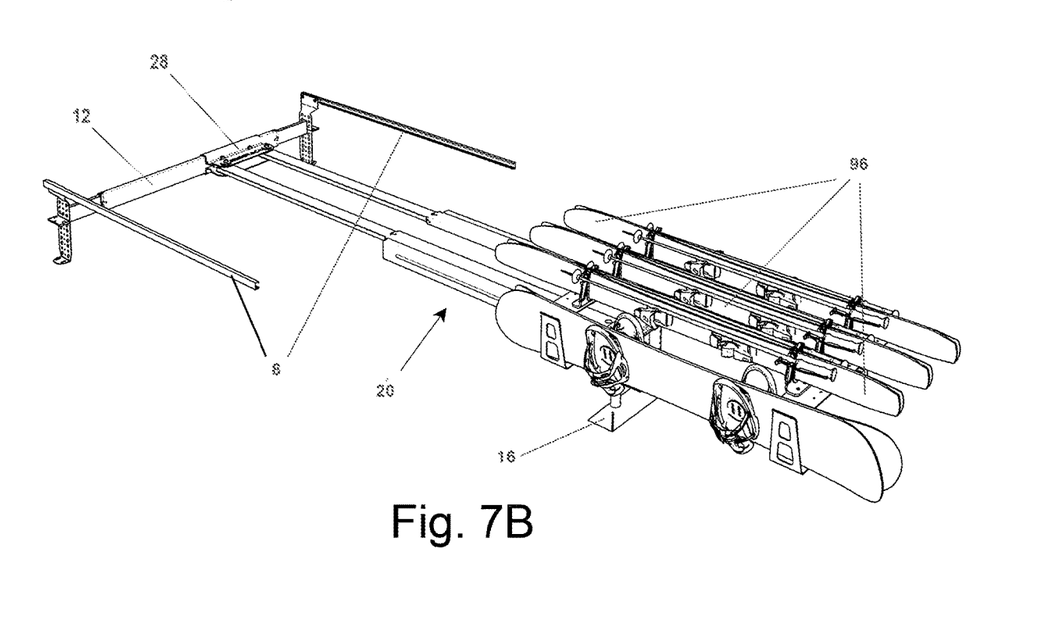

FIGS. 6A and 7A illustrate a mounting system in a forward diagonal position leaving room toward the rear of the truck bed for other equipment. FIGS. 6B and 7B illustrate a mounting system 4 shown in an extended position, wherein, the base assembly 32 has been translated or extended (e.g., to place the base 16 on a tailgate of the vehicle) via extension of the central beam structure 64 from the horizontal tubes 72, and the vertical tubes 68 have been extended out of the central beam structure 64 to provide access to the equipment (e.g., skis 96) to provide ease of access to the equipment.

Figure 8:
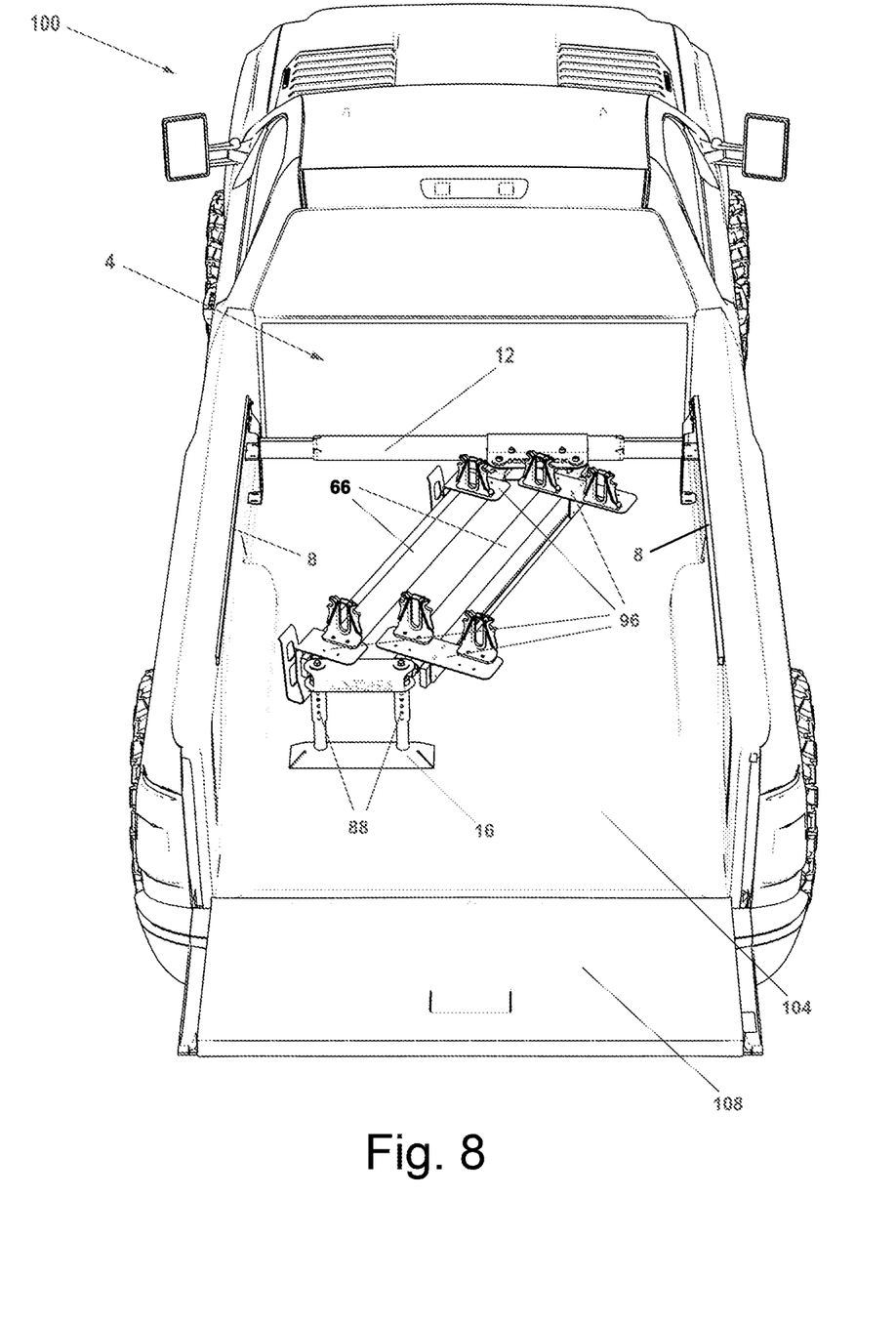
FIG. 8 is a rear-perspective view of the embodiment of the equipment mounting system of FIG. 1 installed in a vehicle and positioned in a stowed position.

FIG. 8 illustrates the mounting system 4 installed in a vehicle 100 that has a bed 104.

The mounting system 4 is in the stowed position with the forward connection assembly 28 slid to toward the right and the base assembly 32 moved to the left so that the system 4 (and any mounted equipment) is fully within the bed 104 so a tailgate 108 can be closed. The extensibility of the beams 20 allows the system to fit different-length beds (e.g., a 5.5 foot length, a 6.5 foot length, etc.). If the bed 104 is long enough, the mounting system 4 (and any mounted equipment) is fully within the bed 104 even when the base assembly 32 is generally in line longitudinally with the forward connection assembly 28. If no equipment is mounted on the mounting system 4, the base assembly can be moved 90° from this position within the bed 104 and to a position where it is lengthwise against the headrail 12, which may be locked. FIG. 8 also illustrates that the headrail 12 is connected to the rail brackets in a lower position so that the equipment can be placed in the bed under a cover (e.g., a tonneau cover). The base assembly 32 is positioned at the same or a similar height to keep a generally level orientation of the mounting system 4.

Figure 9:
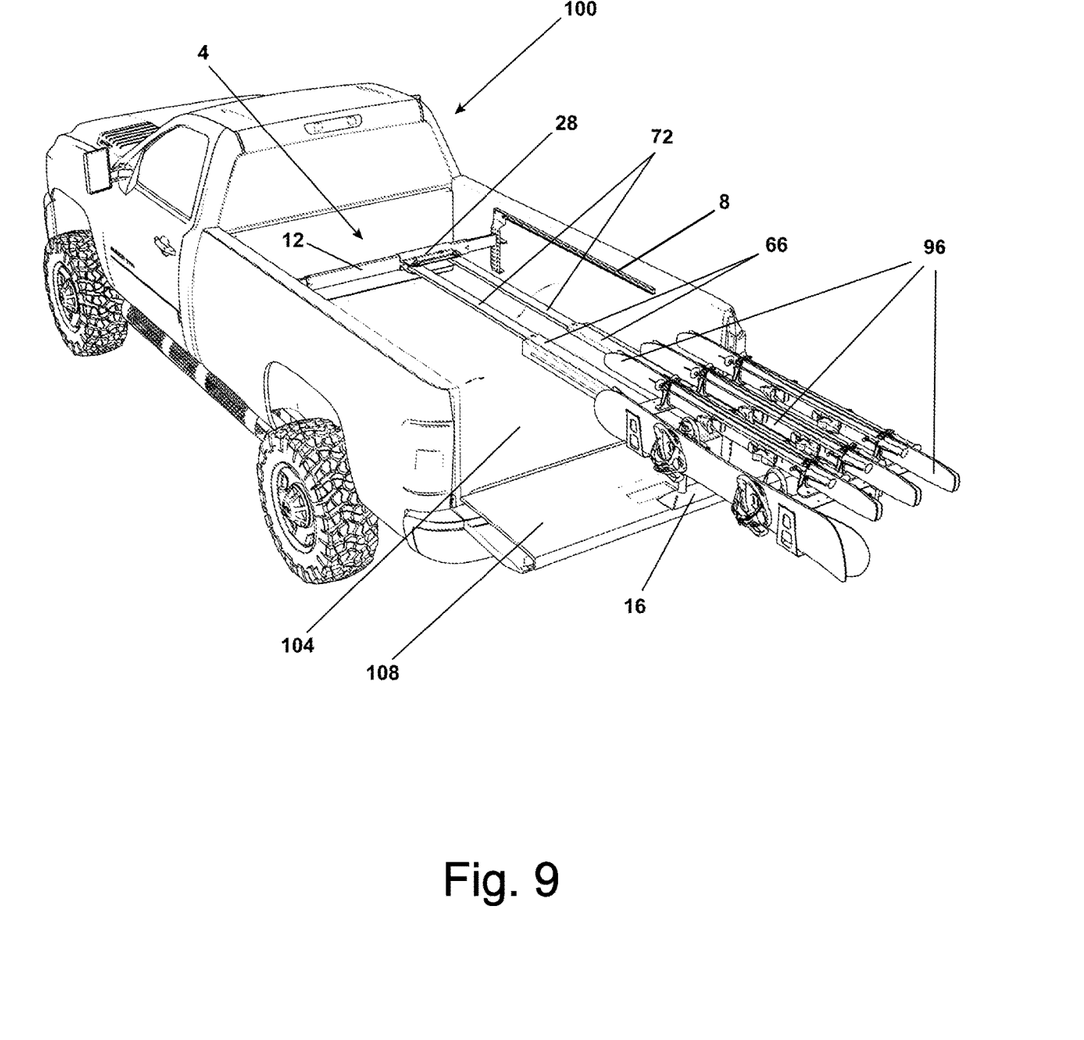
FIG. 9 is a rear-perspective view of the embodiment of the equipment mounting system of FIG. 1 installed in a vehicle and positioned in a extended position.

FIG. 9 illustrates the mounting system 4 installed in a vehicle 100 that has a bed 104 in an extended position. To extend the mounting system 4, a user opens the tailgate 108 or rear of the vehicle and moves the base assembly 32 to the right or left to make extension of the system easier, although such movement is not required to access the mounting system for loading or unloading equipment. The base assembly 32 is then moved in the aft direction to rest on the tailgate 108. Doing so will extend the central beam structure 64 outward from the horizontal tubes 72. Separately, the user can extend the vertical tubes 68 from the central beam structure 64 by pulling the equipment brackets 24, and/or the equipment toward the tailgate 108. The forward connection assembly 28 does not have to be moved along the headrail 12 to move the mounting system 4 to the extended position or retracted position. In embodiments with retainers that hold the tubes 68 in a locked arrangement, the retainers would need to be loosened before extending the tubes 68. The mounting system 4 can be manipulated to the stowed position by reversing the process. That is, the vertical tubes 68 are retracted or pushed into the beam structure 64, the base assembly 32 is pushed into the bed 104 (e.g., moved linearly, or in a combination of linear and pivotal movement) to allow the tailgate 108 to close.

While vehicle rails 8 are shown on opposite sides (i.e., left and right) of the bed 104, a single vehicle rail 8 may be provided at the forward end of the bed (i.e., the end of the bed 104 opposite the tailgate 108). In such a configuration, the forward connection assembly 28 attaches directly to the vehicle rail 8 without the headrail 12 via a cam, clamp, or other retainer provided as part of the forward connection assembly 28.

A cover panel may also be provided that covers the telescoping beams 20 to keep the components clean and moving freely. The cover panel includes at least two sub-panels and is assembled together using loose sliding "tongue and groove" edges such that the tongue side slides freely but remains retained inside the groove. The cover panel is rectangular in overall shape and includes four through holes to accept the pin connections. These connections extend through the cover panel such that the panel moves in sync with the telescoping beams 20 when they are repositioned within the bed 104.

It is contemplated that components of the mounting system 4 include relatively light-weight material such as aluminum or fiber reinforced injection molded or extruded plastic resin. Further, strategic weight saving removal or cored out material in structural components, or strategic design incorporating thinner wall structural ribbing can be utilized to maintain stress load integrity while keeping weight minimized.

In some embodiments, the central beam structure 64 may be provided with only the vertical tube 68 or the horizontal tube 72. In this embodiment, the equipment brackets 24 are attached to the single tube. A forward end of the single tube can be slidable into and out of an opening in the central beam structure 64. An aft end of the tube may be connected to the aft connection assembly 32. Such a configuration does not allow the equipment to be separately extensible from the aft connection assembly 32, but provides a simpler, more cost effective configuration with less complexity. Such a configuration is advantageous because a user can extend both the base 16 relative to the forward connection assembly 28 and any equipment on the equipment brackets 24 relative to the forward connection assembly 28 at the same time.

The mounting system and attached equipment can easily be removed from the headrail 12 by the forward connection assembly 28 and re-attached to secondary headrail for safe storage.

The scope of the present disclosure fully encompasses other embodiments which may become obvious to those skilled in the art, and is to be limited, accordingly, by nothing other than the appended claims. All structural and functional equivalents to the elements of the above-described preferred embodiment and additional embodiments as regarded by those of ordinary skill in the art are hereby expressly incorporated by reference and are intended to be encompassed by the present claims. Furthermore, no element, component, or method step in the present disclosure is intended to be dedicated to the public regardless of whether the element, component, or method step is explicitly recited in the claim.

What is claimed is:

1. A vehicular equipment mounting system comprising:
   a headrail attachable to said vehicle;
   a forward connection assembly attached to said headrail wherein said forward connection assembly is capable of sliding back and forth along said headrail after said headrail is attached to said vehicle;
   an aft connection assembly;
   a base;
   two or more parallel telescoping beams
   wherein said beams connect said forward connection assembly to said aft connection assembly; and
   wherein said beams, said aft connection assembly, and said base are capable of sliding side to side, backwards and forwards, and diagonally, relative to said headrail while said headrail stays fixed in relation to said attachable vehicle.

2. The mounting system of claim 1, wherein said two or more parallel telescoping beams can be moved lengthwise against said headrail.

3. The mounting system of claim 1, wherein said two or more parallel telescoping beams can lock into position.

4. The mounting system of claim 1, wherein said telescoping beams comprise central beam structures from which slidable forward and rear sections extend from each beam and lock into position.

5. The mounting system of claim 4, further comprising a retainer to fix said forward and rear sections to a specific extension.

6. The mounting system of claim 4, further comprising a mounting bracket connected to said central beam structure.

7. The mounting system of claim 4, wherein a mounting bracket is connected to said slidable rear sections.

8. The mounting system of claim 1, wherein said headrail is telescoping and can lock into position.

9. The mounting system of claim 8, wherein said headrail can be pressure fit between two opposing walls.

10. The mounting system of claim 1, wherein said headrail is capable of attaching to mounting rails attached to a vehicle that are horizontal relative to said beams.

11. The mounting system of claim 10, wherein said headrail is capable of attaching to standard factory installed truck bed T-track mounting rails.

12. The mounting system of claim 1, wherein said headrail and said base can be adjusted vertically and lock into position.

13. The mounting system of claim 1, wherein said aft connection assembly further comprises said base.

14. The mounting system of claim 1, further comprising a mounting bracket for skis.

15. The mounting system of claim 1, further comprising a mounting bracket for snowboards.

16. The mounting system of claim 1, wherein said base can be used as a pivot point for a user to slide said forward connection assembly along said headrail and wherein said forward connection assembly connected to said headrail can be used as a pivot point to move said base in any horizontal direction relative to said headrail.

\* \* \* \* \*